United States Patent [19]

Dietiker

[11] Patent Number: 5,413,141
[45] Date of Patent: May 9, 1995

[54] TWO-STAGE GAS VALVE WITH NATURAL/LP GAS CONVERSION CAPABILITY

[75] Inventor: Paul Dietiker, Redondo Beach, Calif.

[73] Assignee: Honeywell Inc., Minneapolis, Minn.

[21] Appl. No.: 299,775

[22] Filed: Sep. 1, 1994

Related U.S. Application Data

[63] Continuation-in-part of Ser. No. 179,027, Jan. 7, 1994, abandoned.

[51] Int. Cl.[6] .............................................. G05D 16/06
[52] U.S. Cl. ........................................ 137/489; 251/26
[58] Field of Search ............................ 137/489; 251/26

[56] References Cited

U.S. PATENT DOCUMENTS 4,790,352 12/1988 Dietiker ........................... 137/613
4,850,530 7/1989 Uecker .......................... 137/489 X Primary Examiner—Robert G. Nilson
Attorney, Agent, or Firm—Charles L. Rubow

[57] ABSTRACT

A convertible two-stage pressure regulator in which a main valve regulates fluid flow between an inlet and an outlet in response to a control pressure produced by first and second regulator valves arranged in parallel, the control pressure depending on the outlet pressure and the forces applied by compression springs to diaphragms carrying the first and second regulator valve closure elements. An electrically operated valve is provided for selectively disabling the second regulator valve whose regulator spring applies a higher force than the spring of the first regulator valve. The compressions of the regulator valve springs are coordinately varied by a manually operable selector mechanism for converting between natural and LP gas usages.

7 Claims, 4 Drawing Sheets

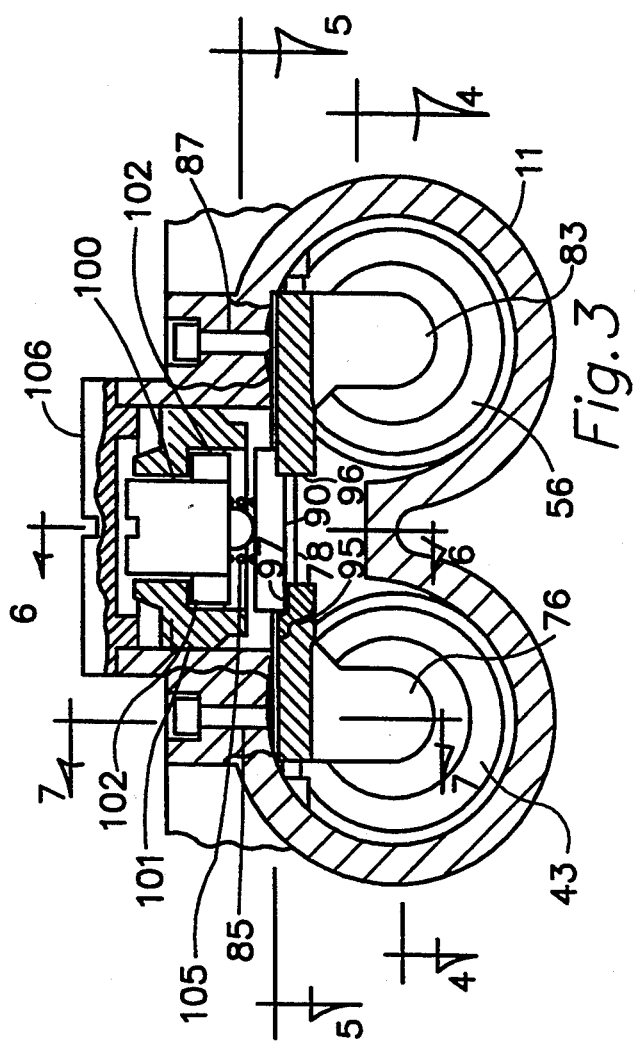
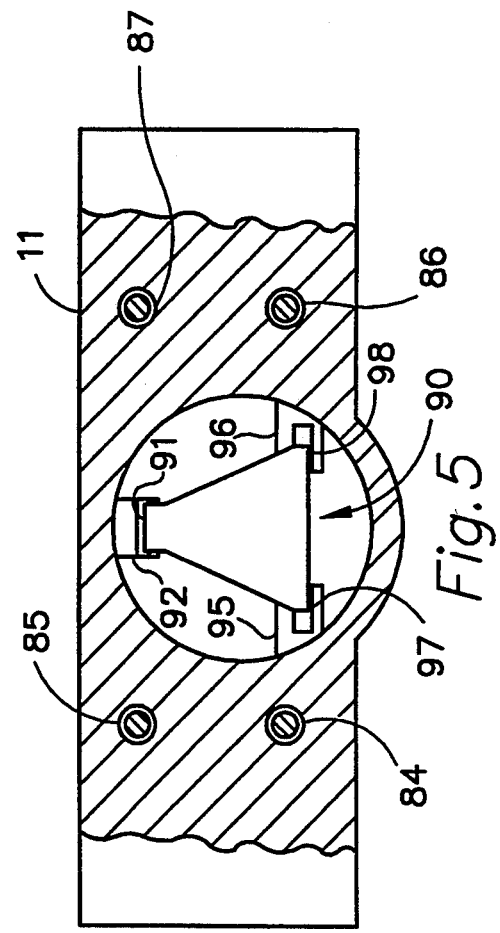
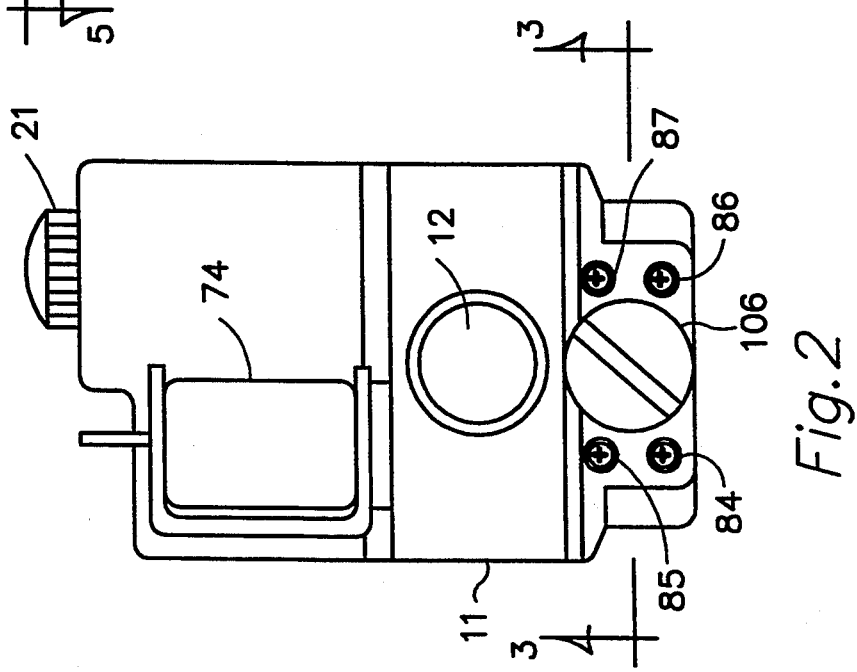

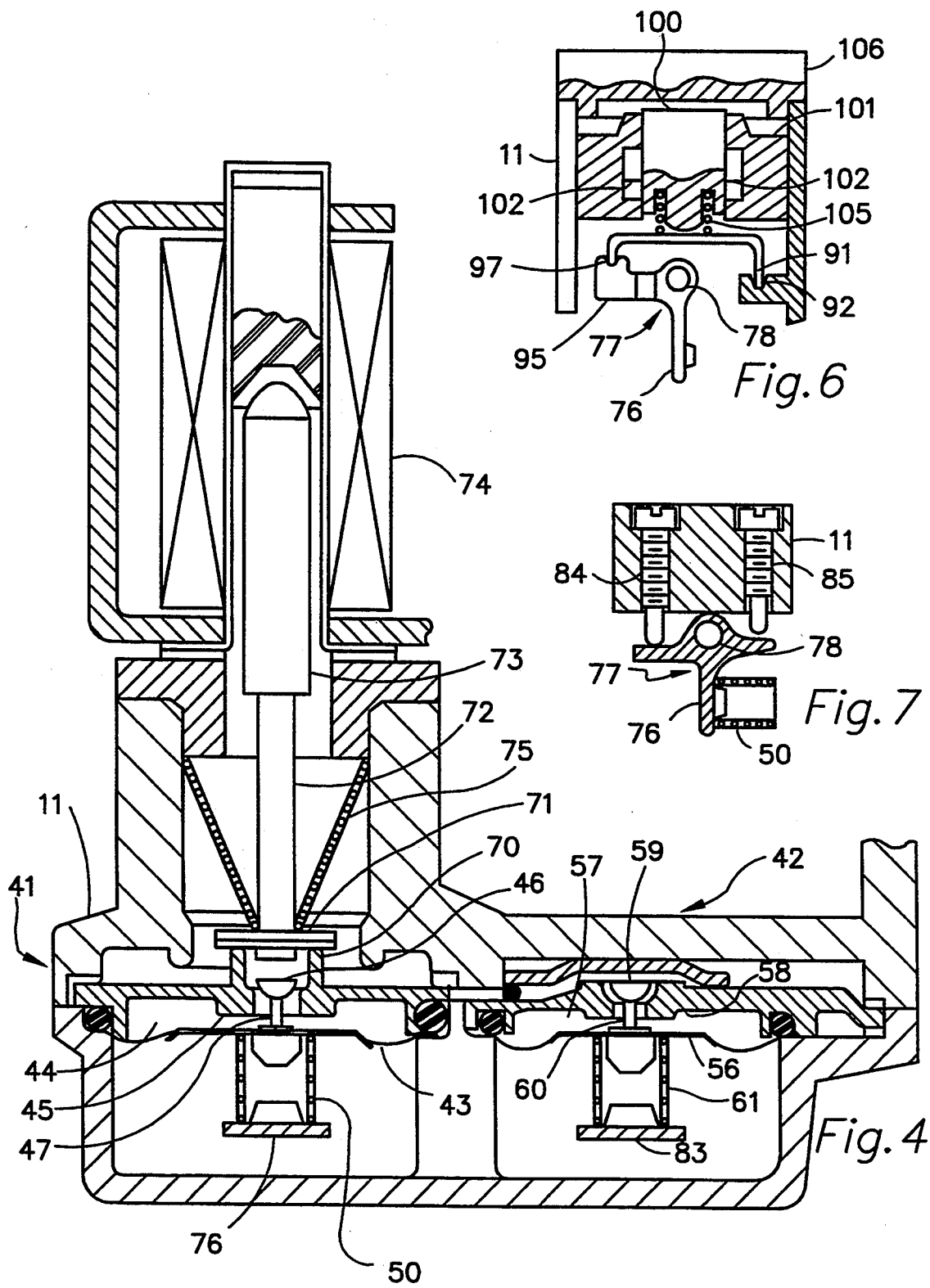

TWO-STAGE GAS VALVE WITH NATURAL/LP GAS CONVERSION CAPABILITY

CROSS REFERENCE TO ELATED APPLICATIONS

This application is a continuation-in-part of application Ser. No. 08/179,027 filed Jan. 7, 1994, now abandoned.

BACKGROUND OF THE INVENTION

The present invention relates generally to fluid pressure regulators, and more specifically, to two-stage pressure regulating valves convertible without parts replacement for use with LP or natural gas.

Applications have existed for some time for pressure regulating valves capable of regulating to either of two electrically selected pressures. In general, applications have been somewhat specialized, and the required volumes relatively small, thus providing little incentive for exploring nontraditional designs. To the extent two-stage pressure regulator valve designs are known, they generally employ a solenoid actuator to control the force supplied by a regulator spring.

A pressure regulating valve application which has begun to receive increasing interest is in connection with fuel gas valves for small furnaces, such as those used in single family residences, including both permanent fixed location homes and mobile homes. Certain U.S. furnace manufacturers have developed high efficiency furnace designs which rely on two stages of furnace operation. When heat is first called for, and under moderate heat requirements, the furnace is fired at a low to moderate rate. If firing at that rate does not provide the heat output required for existing conditions, firing is stepped to a higher rate.

Another factor which impacts gas valve manufacturers and users is that both natural gas and gas produced from liquefied petroleum (LP) or propane are in common use as fuel gases. These gases have different burning characteristics, and are supplied to a furnace or other burner apparatus under different pressures. Specifically, gas generated from liquefied petroleum has a faster flame front. Accordingly, it is supplied to a burner at a higher pressure, e.g., 10 inches $H_2O$, which induces more oxygen entrainment. In contrast, natural gas is typically supplied to a furnace or burner at a pressure of 3.5 inches $H_2O$. Accordingly, a pressure regulating gas valve for a furnace or other appliance must regulate to a higher pressure for LP gas than for natural gas.

There are various situations in which it is not known at the outset which type of fuel gas will be used, and/or in which the type of fuel gas may be changed at some point during the operating life of the furnace or other appliance. Either situation often occurs with a mobile home. Another common situation is in connection with new construction of permanent fixed location dwellings. Initially natural gas may not be available because underground gas lines are not in place in the area, or because hook up to natural gas lines is delayed by frozen ground, or for other reasons.

Typical solutions in the past have been to either change out the entire gas valve at the time of conversion to a different fuel gas, or to replace certain components such as regulator springs or pressure regulator modules. Both of these solutions are undesirable for several reasons. Further, mobile home requirements now dictate that gas valve conversion be achievable without replacement of gas valve parts.

Although gas valves are available for two-stage operation, and gas valves are available which provide for conversion without parts replacement, an increasing need exists for a single gas valve which achieves both objectives. The applicant has devised a design for such a valve which retains the advantageous features of prior limited purpose designs, while adding the capability of both two-stage operation and no parts replacement conversion in a single unit.

SUMMARY OF THE INVENTION

The invention is a pressure regulator having first and second electrically determinable stages for each of two pressure ranges which may correspond to pressure ranges suitable for natural and LP gas usage respectively. The pressure regulator includes first and second regulator valve assemblies arranged in parallel for producing a control pressure which controls operation of a main valve in response to the fluid outlet pressure and biasing provided by first and second variable biasing means in the first and second regulator valve assemblies respectively, the force applied by the first variable biasing means being smaller than the force applied by the second variable biasing means. A selection mechanism is provided for coordinately varying the forces applied by the variable biasing means in the first and second regulator valve assemblies, and electrically operable means is provided for selectively disabling the second regulator valve assembly.

The variable biasing means in the first and second regulator valve assemblies may comprise first and second compression springs which are variably compressed between spring retainers on first and second variable position reaction members and diaphragms in the regulator valve assemblies, the positions of the first and second variable position reaction members being coordinately varied by a tilting plate member having first, second and third locations thereon in a triangular arrangement and a fourth location thereon between the first, second and third locations, the tilting plate member being adapted for pivotal movement relative to the regulator valve housing at the first location, the second and third locations being operatively connected to the first and second variable position reaction members, the tilting plate member further being in contact with a selector element operable to produce translation of the fourth location relative to the regulator valve housing.

BRIEF DESCRIPTION OF THE DRAWINGS

FIG. 2 is an exterior end view of the valve of FIG. 1, as seen from the inlet end of the valve, and showing externally accessible adjusting elements;

FIG. 3 is an enlarged cross-sectional view of the valve taken along lines 3—3 in FIG. 2;

FIG. 4 is an enlarged cross-sectional view of the valve taken along lines 4—4 in FIG. 3;

FIG. 5 is an enlarged cross-sectional view taken along lines 5—5 in FIG. 3;

FIG. 6 is an enlarged partial cross-sectional view taken along lines 6—6 in FIG. 3;

FIG. 7 is an enlarged partial cross-sectional view taken along lines 7—7 in FIG. 3.

DESCRIPTION OF THE PREFERRED EMBODIMENT

For purposes of facilitating a disclosure of the applicant's invention, it will be described in the context of a fuel gas valve capable of providing electrically selectable low and high flow rates in either of two selectable pressure ranges suitable for natural and LP gas usages respectively. However, usefulness of the invention is not limited to such an application, but extends to a variety of other applications which would benefit from a valve having exceptionally flexible control characteristics.

Figure 1:
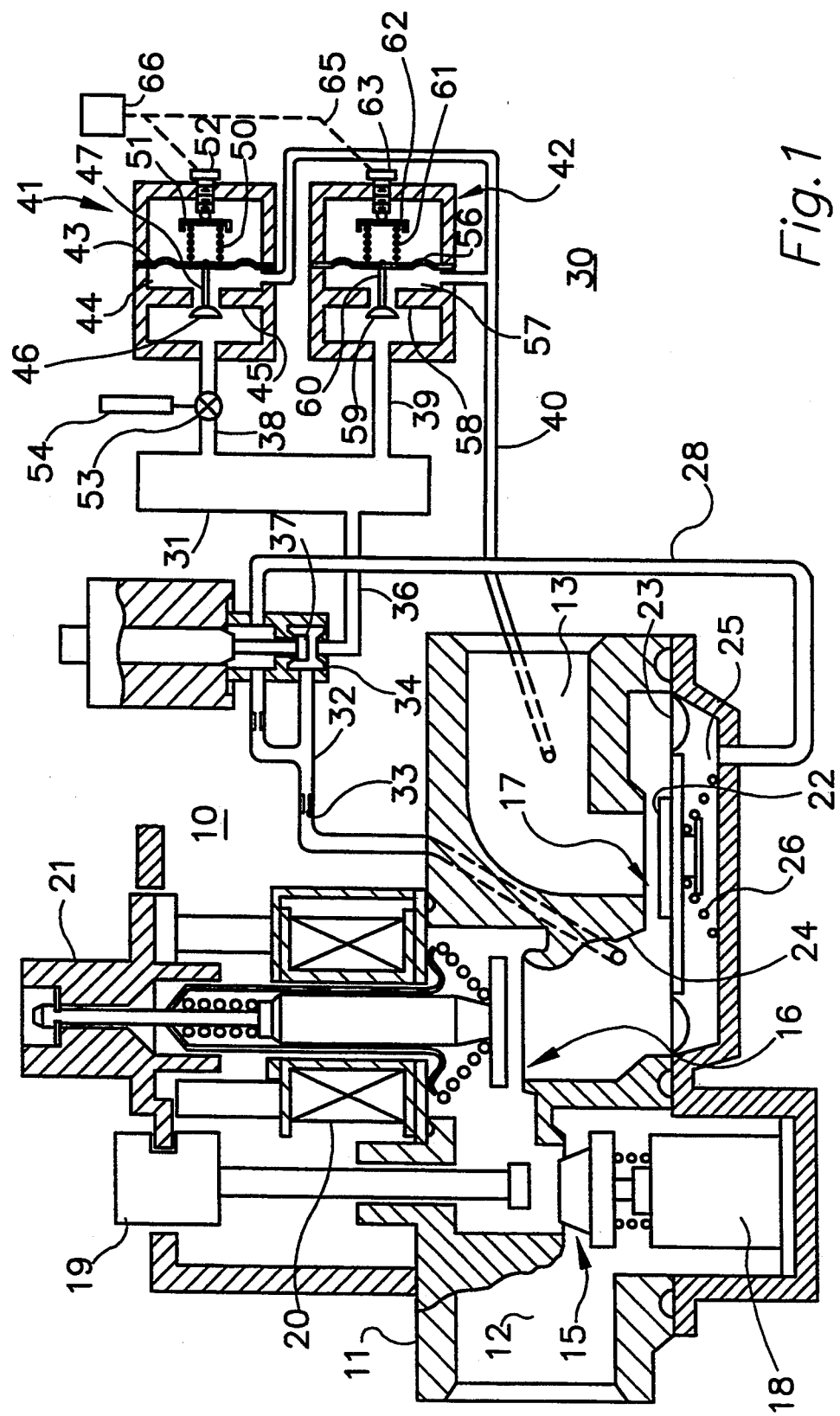
FIG. 1 is a partially schematic cross-sectional view of a convertible two-stage gas valve in accordance with the applicant's invention.

In FIG. 1, reference numeral 10 generally identifies a fuel gas valve, which, except for the pressure regulating portion, is similar to a gas valve of conventional design shown and described in detail in U.S. Pat. No. 4,790,352 issued Dec. 13, 1988, to the applicant in the present application. Valve 10 includes a housing 11, which, for simplicity of illustration, is shown in several parts in FIG. 1. Portions of valve 10 are also shown in general schematic form in FIG. 1 for purposes of facilitating a broad understanding of the functional relationship between the principal components. As actually implemented, all components would most likely be integrated into a single housing means, as shown in FIGS. 3-7.

As shown in FIG. 1, housing 11 defines a fluid inlet passageway 12 and a fluid outlet passageway 13 connected through a series of three valves generally identified by reference numerals 15, 16 and 17, of which valve 17 will hereinafter be referred to as the main valve. Valve 15 functions as a safety valve having a power unit 18 which may be controlled by a flame sensing thermocouple, whereby valve 15 is normally held open only if a satisfactory flame is present in a furnace of which gas valve 10 is a part. For purposes of initially establishing the flame, valve 15 may be temporarily manually held open by means of a reset button 19.

Valve 16 is controlled by a solenoid 20, provided a control knob 21 is properly positioned, in response to a heat demand signal which may be produced by a thermostat. Thus, if permitted by the apparatus associated with knob 21, solenoid 20 will open valve 16 when there is demand for heat, and will close valve 16 when the demand for heat is satisfied.

Main valve 17 includes a valve closure member 22 carried on a diaphragm actuator 23. Closure member 22 cooperates with a main valve seat 24 to vary the flow of gas between inlet passageway 12 and outlet passageway 13, provided valves 15 and 16 are open. A pressure chamber 25 is formed between housing 11 and a first side of diaphragm 23 on the opposite side of the diaphragm from valve seat 24. A compression spring 26 within pressure chamber 25 between housing 11 and the first side of diaphragm 23 biases closure member 22 toward valve seat 24 to normally maintain valve 17 in a closed state.

Valve 17, however, may be variably opened by a pressure differential between opposite sides of diaphragm 23 as follows. Assuming valves 15 and 16 are open, the side of diaphragm 23 on which closure member 22 is mounted is subjected to the inlet gas pressure, which tends to open valve 17. However, the force produced by spring 26 is sufficient to keep valve 17 closed under normal inlet gas pressure unless the pressure in pressure chamber 25 is significantly less than the inlet gas pressure. In operation, the control pressure in chamber 25 is communicated thereto through a control pressure passageway 28, and is determined by the pressures in inlet passageway 12, outlet passageway 13 and regulator valve apparatus generally identified by reference numeral 30.

Specifically, the pressure in inlet passageway 12 is transmitted to a manifold 31 through a first conduit 32 containing a flow restrictor 33, in series with a valve 34 actuated by a servo operator solenoid 35. Valve 34 includes first and second inlet ports of which the first is connected to conduit 32 immediately downstream of flow restrictor 33, and the second is connected to conduit 32 through an additional flow restrictor in series with flow restrictor 33. Valve 34 also includes first and second outlet ports, of which the first communicates with the first inlet port through a first valve seat. The second outlet port of valve 34 similarly communicates with the first inlet port through a second valve seat. As further illustrated in FIG. 1, valve 34 is configured to allow direct fluid communication between the second inlet port and the second outlet port, without requiring flow through either of the valve seats. The first and second outlet ports are respectively connected to manifold 31 through a conduit 36 and to pressure chamber 25 through control pressure passageway 28.

A closure element 37 carried on the plunger of servo operator solenoid 35 may be positioned by the solenoid to either of first or second positions in which it blocks flow through the first or second valve seats respectively. Manifold 31 is connected to outlet passageway 13 through conduits 38 and/or 39, regulator valve apparatus 30 and a sensing passageway or conduit 40.

With closure element 37 in its first position, blocking flow through the first valve seat, the pressure in inlet passageway 12 is transmitted through conduits 32 and 28 to pressure chamber 25 thereby maintaining main valve 17 in its closed state. With closure element 37 in its second position shown in FIG. 1, blocking flow through the second valve seat, the pressure in pressure chamber 25, and therefore position of main valve closure member 22 relative to main valve seat 24 is determined by regulator valve apparatus 30 as will be described hereinafter.

Regulator valve apparatus 30 includes first and second regulator valve assemblies 41 and 42 arranged in parallel which affect the control pressure in control pressure passageway 28. Regulator valve assembly 41 includes a valve actuator in the form of a diaphragm 43 which cooperates with housing 11 to form a pressure chamber 44 between the first side of the diaphragm and a portion of the housing. Pressure chamber 44 is separated into two compartments by a valve seat 45, the two compartments being connected to conduits 38 and 40 respectively, whereby valve seat 45 provides for fluid communication between conduits 38 and 40.

Diaphragm 43 carries a valve closure member 46 on a valve stem 47 which extends through valve seat 45 to control fluid flow between conduits 38 and 40. The deflection of diaphragm 43 and the position of closure member 46 relative to valve seat 45 are controlled by the pressure in outlet passageway 13, as communicated through conduit 40, and a force exerted on the opposite side of diaphragm 43 by a regulator compression spring 50. Regulator compression spring 50 has a first end seated on the second side of diaphragm 43 and a second end seated on an adjustable spring retainer 51 whose position relative to housing 11 is schematically illustrated as being adjustable by means of a screw 52.

Regulator valve assembly 41 can be functionally disabled by valve apparatus 53 in conduit 38. Valve apparatus 53 may be selectively controlled by an actuator 54. As will be described in greater detail hereinafter, actuator 54 is preferably an electrically operated solenoid.

The construction of regulator valve assembly 42 is similar to that of regulator valve assembly 41. Regulator valve assembly 42 includes a diaphragm 56, a pressure chamber 57 separated into two compartments by a valve seat 58, the two compartments being connected to conduits 39 and 40 respectively. Regulator valve assembly 42 further includes a valve closure member 59 carried on diaphragm 56 by a means of a valve stem 60. A regulator spring 61 is mounted between the side of diaphragm 56 opposite chamber 57 and an adjustable spring retainer 62 whose position relative to housing 11 is schematically illustrated as adjustable by means of a screw 63. For reasons which will be described hereinafter, regulator spring 61 is designed and/or arranged to apply a smaller force than regulator spring 50. Adjusting screws 52 and 63 are illustrated as under coordinated control by dashed line 65 leading to a single selector element 66.

For purposes of the remaining description it will be assumed that valve 34 is in a state providing fluid communication between conduits 32 and 36. With that assumption, if valve apparatus 53 is open, regulator valve assembly 41 is operative, which effectively overrides operation of regulator valve assembly 42. Specifically, the deflection of diaphragm 43 is determined by the force applied thereto by regulator spring 50 and the pressure in chamber 44 communicated thereto from outlet passageway 13. Similarly, the deflection of diaphragm 56 is determined by the force applied thereto by regulator spring 61 and the pressure in chamber 57 communicated thereto from outlet passageway 13. Since the force applied by regulator spring 50 is greater than that applied by regulator spring 61, increasing pressure in outlet passageway 13 will close regulator valve assembly 42 before it closes regulator valve assembly 41, leaving regulator valve assembly 41 as the only operative regulator valve.

Considering only operative regulator valve assembly 41, if the pressure in outlet passageway 13 decreases, the pressure on the side of diaphragm 43 opposite spring 50 likewise decreases, and spring 50 deflects diaphragm 43 to the left, thus moving closure member 46 away frown valve seat 4.5. This opens regulator valve assembly 41 and decreases the pressure in conduit 28 and pressure chamber 25 by allowing the pressure to bleed off through valve 34 and manifold 31 to outlet passageway 13. The reduced pressure in pressure chamber 25 causes diaphragm 23 to deflect downwardly, thus opening main valve 17 and restoring the pressure in outlet passageway 13 to the value determined by the setting of adjustable spring retainer 51.

If valve apparatus 53 is closed, regulator valve assembly 41 becomes ineffective, and the pressure in outlet passageway 13 is controlled to a pressure established by regulator valve assembly 42 which operates in the same manner as regulator valve assembly 41. Thus, valve 10 can be electrically controlled to either of lower or higher predetermined pressures to provide two-stage operation. Further, the pressure range within which the lower and higher pressures fall can be changed by selector element 66, which may, for example, be implemented to provide pressure ranges suitable for natural and LP gas respectively.

Turning now to the views of FIGS. 2-7, the housing and the diaphragms, pressure chambers, valve seats, closure members, valve stems and regulator springs of the first and second regulator valve assemblies are shown and identified by the same reference numerals as used in FIG. 1. Valve apparatus 53 schematically illustrated in FIG. 1 is implemented as shown in FIG. 4 by means of a second valve seat 70 in the member forming valve seat 45 and coaxial with valve seat 45. Valve seat 70 cooperates with a valve closure member 71 which is movable with respect to valve seat 70 to selectively block fluid flow through regulator valve assembly 41. Closure member 71 is carried on a valve stem 72 connected to a plunger 73 of a solenoid 74. A compression spring 75 between a component of housing 11 and closure member 71 biases the closure member toward valve seat 70 so as to normally disable regulator valve assembly 41. Energization of solenoid 74 causes closure member 71 to be pulled away from valve seat 70, thereby enabling regulator valve assembly 41.

Figure 8:
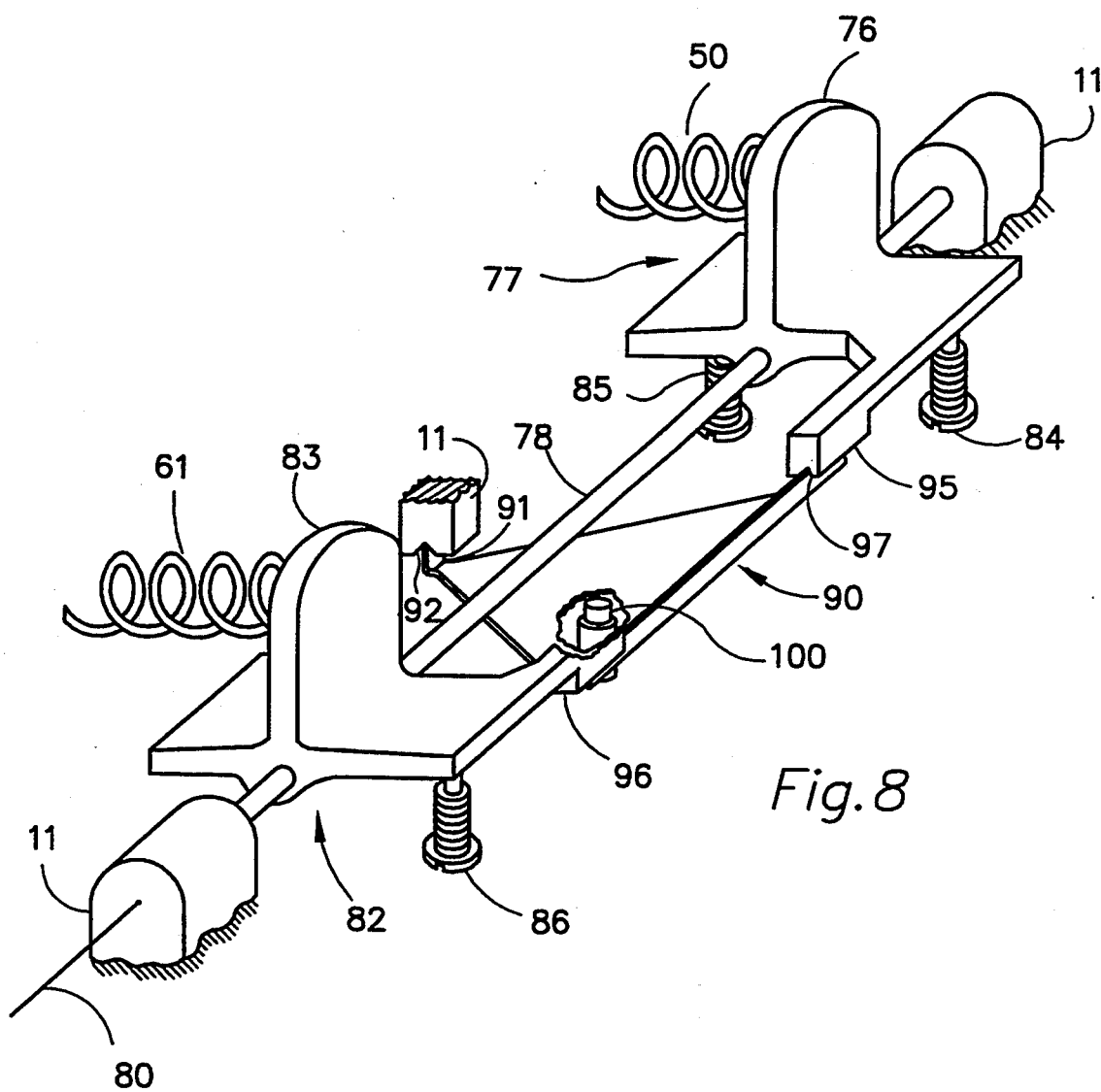
FIG. 8 is a partial perspective schematic illustration of a mechanism for achieving coordinated variation of the compression of a pair of regulator valve springs employed in the applicant's valve.

As further shown in FIG. 4, regulator spring 50 is compressed between diaphragm 43 and a spring retainer on a variable position reaction member 76. As shown in FIG. 6-8 variable position reaction member 76 comprises the leg of a T-shaped lever generally identified by reference numeral 77 which is carried on a shaft 78 mounted in housing 11, and is adapted for pivotal movement about an axis 80 with which shaft 78 is aligned. Rotation of T-shaped lever 77 to its clockwise limiting position provides minimum compression of spring 50, which establishes the high pressure, high flow rate condition for the natural gas pressure range setting of valve 10.

The low pressure, low flow rate condition is established by a second T-shaped lever 82 also mounted on shaft 78 for rotation about axis 80. Lever 82 has the configuration of a mirror image of lever 77. The leg of lever 82 forms a variable position reaction member 83 with a spring retainer for variably compressing regulator spring 61 against diaphragm 56.

T-shaped levers 77 and 82 include arms generally extending in opposite directions from shaft 78 which provide bearing surfaces for adjustable stops which establish the limiting rotational positions of the levers. The adjustable stops are shown in the form of set screws in housing 11 generally perpendicular to the plane of the arms of the T-shaped members, and positioned to intersect the arms near the extremities thereof. More specifically, a first adjustable stop or set screw 84 is positioned to limit rotation of lever 77 in a clockwise direction as seen in FIGS. 6 and 7, thereby establishing the high pressure, high flow rate condition for the natural gas pressure range setting of valve 10. A second adjustable stop or set screw 85 is positioned to limit rotation of lever 77 in a counterclockwise direction, thereby establishing a high pressure, high flow rate condition for the LP gas pressure range setting of valve 10. Corresponding adjustable stops or set screws 86 and 87 are associated with lever 82, and function to limit clockwise and counterclockwise rotation of the lever respectively. The clockwise and counterclockwise positions of lever 82 establish the minimum and maximum compression conditions of regulator spring 61, and correspondingly establish the low pressure, low flow condition for the natural and LP gas pressure range settings of valve 10.

Levers 77 and 82 are normally biased to their clockwise positions against stops 84 and 86 as a result of the forces supplied by regulator springs 50 and 61 respectively. As indicated, this corresponds to the natural gas pressure range setting. However, the levers can be rotated to their counter clockwise or LP gas pressure range setting in a coordinated manner by mechanical linkage including a triangular tilting plate, or swash plate 90. A first corner 91 of plate 90, which is shown bent upwardly from the plane of the plate in FIG. 8, is received in a notch 92 in housing 11, thereby allowing for pivotal movement of the plate relative to the housing about its first corner.

The edge of plate 90 opposite first corner 91 is also bent upwardly as seen in FIGS. 8 to form a flange of which opposite ends are received in notches in lateral extensions of the arms of T-shaped levers 77 and 82 which cooperate with adjustable stops 84 and 86 respectively. More specifically, the lateral extensions of levers 77 and 82 are identified by reference numerals 95 and 96 respectively, and have notches 97 and 98 therein for receiving the ends of the flange on plate 90.

Plate 90 can be caused to rotate in a counterclockwise direction as seen in FIG. 6 about corner 91 by exerting downward force at a location on the plate between the corners thereof. In the illustrated mechanization, this force is applied by a selector element 100 which extends in a direction substantially perpendicular to the plane of plate 90 through an insert 101 in housing 11. Selector element 100 is shown as having a cylindrical body with radial projections 102 thereon which cooperate with a stepped configuration in the internal surface of insert 101 to permit the selector element to be maintained at either of two longitudinal positions within housing 11. Selector element 100 is shown in its extended position in FIG. 3. It can be retained in a depressed position by depressing it inwardly and rotating it a portion of a turn. A screwdriver slot is shown in the outer end of selector element 100 for facilitating rotation thereof.

The inner end of selector element 100 is shown with a hemispherical projection thereon adjacent plate 90. A compression spring 105 is shown between a seat on the inner end of selector element 100 and plate 90. This spring is optional, and may be provided to take up any slack which may exist with selector element 100 in its extended position.

Depression of selector element 100 causes plate 90 to pivot, thereby rotating levers 77 and 82 against stops 85 and 87 respectively. This results in compression of regulator springs 50 and 61, and sets valve 10 for LP gas usage. A cap 106 is shown covering the access opening to selection member 100 in housing 11.

As is apparent from the foregoing description, the applicant has provided a unique valve design which provides for two-stage operation in either of two pressure ranges which may correspond to the pressure ranges required for natural and LP gas operation. The conversion between pressure ranges is accomplished by simply resetting a selection member. The valve thus complies with industry requirements for pressure range conversion without replacing gas valve parts.

Although a particular gas valve mechanization has been shown and described in detail for illustrative purposes, a variety of modifications which do not depart from the applicant's contemplation and teaching will be apparent to those of ordinary skill and relevant art. It is not intended that coverage be limited to the embodiment shown, but only by the terms of the following claims.

The embodiments of the invention in which an exclusive property or right is claimed are defined as follows:

1. A pressure regulator having first and second electrically determinable states for each of a plurality of pressure ranges, the pressure range being changeable without parts replacement, the pressure regulator comprising:
   housing means defining fluid inlet and fluid outlet passageways and a main valve seat providing for flow between the fluid inlet and fluid outlet passageways;
   a main valve closure member mounted in said housing means for movement relative to the main valve seat for varying the flow between the fluid inlet and outlet passageways;
   a main valve actuator operable to vary the position of said main valve closure member relative to the valve seat in response to variations in a control pressure;
   first and second regulator valve assemblies arranged in parallel for producing the control pressure in response to the pressure in the fluid outlet passageway, the control pressure further being dependent on biasing provided by first and second variable biasing means in the first and second regulator valve assemblies respectively, the first variable biasing means applying a smaller force than the second variable biasing means;
   selection means operable in response to a selection input to coordinately vary the forces applied by the first and second variable biasing means; and
   electrically operable means for disabling said second regulator valve assembly.

2. The pressure regulator of claim 1 wherein:
   the first and second variable biasing means comprise first and second compression springs operative to affect the openings of first and second valves in said first and second regulator valve assemblies respectively; and
   said selection means comprises a mechanical linkage assembly arranged to coordinately change the compressions of the first and second compression springs in response to actuation of a selector element.

3. The pressure regulator of claim 2 further including:
   a regulator valve housing;
   a first diaphragm having first and second sides mounted in said regulator valve housing, said regulator valve housing and said first diaphragm being configured and cooperating to form a first pressure chamber between said regulator valve housing and the first side of said first diaphragm;
   a sensing passageway between the first pressure chamber and the fluid outlet passageway in said housing means for supplying the fluid outlet pressure to the first pressure chamber;
   first mounting means for mounting the first compression spring between the second side of said first diaphragm and a first variable position reaction member in the mechanical linkage assembly so as to displace said first diaphragm toward the first pressure chamber;
   a second diaphragm having first and second sides mounted in said regulator valve housing, said regulator valve housing and said second diaphragm being configured and cooperating to form a second pressure chamber between said regulator valve housing and the first side of said second diaphragm;

second mounting means for mounting the second compression spring between the second side of the said second diaphragm and a second variable position reaction member in the mechanical linkage assembly so as to displace said second diaphragm toward the second pressure chamber;

selection means for coordinately controlling the positions of said first and second variable position reaction members;

control passageway means for providing fluid communication between the fluid outlet passageway and said main valve actuator individually through stationery valve seats in said first and second regulator valve assemblies respectively; and first and second regulator valve closure members positioned relative to first and second stationery valve seats of said first and second regulator valve assemblies by said first and second diaphragms respectively.

4. The pressure regulator of claim 3 wherein said control passageway means includes:

a manifold;

a first conduit containing a flow restrictor connecting the inlet passageway in said housing means to the manifold;

a second conduit connecting the manifold through the valve seat of said first regulator valve assembly and the first pressure chamber to the outlet passageway in said housing means;

a third conduit connecting the manifold through the valve seat of said second regulator valve assembly and the second pressure chamber to the outlet passageway in said housing means;

an electrically operable valve in the third conduit for selectively blocking the third conduit; and a fourth conduit connecting the manifold to said main valve actuator.

5. The pressure regulator of claim 4 wherein:

the mechanical linkage assembly includes a tilting plate member having first, second and third locations thereon in a triangular arrangement and a fourth location thereon between the first, second and third locations, said tilting plate member being adapted for pivotal movement about the first location relative to said regulator valve housing, the second and third locations being operatively connected to the first and second variable position reaction members respectively to variably compress the first and second compression springs; and the selector element is operatively connected to the tilting plate member at the fourth location thereon, and is operable to translate the fourth location relative to said regulator valve housing.

6. The pressure regulator of claim 5 wherein:

said main valve actuator includes a third diaphragm having first and second sides mounted in said housing means, said third diaphragm and said housing means being configured and cooperating to form a third pressure chamber between said housing means and the first side of said third diaphragm, the control pressure being supplied to the third pressure chamber through the fourth conduit;

said main valve closure member is connected to the third diaphragm to be positioned thereby relative to the main valve seat; and spring biasing means is provided and arranged to tend to move said main valve closure member toward the main valve seat.

7. The pressure regulator of claim 6 wherein:

the first and second variable position reaction members each comprise a lever rotatable at a first location thereon about an axis fixed relative to the regulator valve housing, the levers of the first and second variable position reaction members each having a spring retainer at a second location thereon in contact with the first and second compression springs respectively for compressing the first and second compression springs between the respective spring retainers of the first and second variable position reaction members and said first and second diaphragms, the levers of the first and second variable position reaction members further each having a third location thereon to which the second and third locations on the tilting plate member are operatively connected; and first and second adjustable stops are respectively associated with each of the levers in the first and second variable reaction members and arranged to limit the rotations of the associated levers respectively in opposite directions about the axis.

* * * * *

UNITED STATES PATENT AND TRADEMARK OFFICE
CERTIFICATE OF CORRECTION

PATENT NO. : 5,413,141
DATED : May 9, 1995
INVENTOR(S) : Paul Dietiker

It is certified that error appears in the above-indentified patent and that said Letters Patent is hereby corrected as shown below:

```
Title page, item [57], col. 2,
In the Abstract; line 14, replace "convening" with --converting--.
```

Signed and Sealed this

Twenty-second Day of August, 1995

Attest:

BRUCE LEHMAN

*Attesting Officer*     *Commissioner of Patents and Trademarks*